United States Patent [19]

Engle et al.

[11] Patent Number: 5,888,290

[45] Date of Patent: Mar. 30, 1999

[54] COMPOSITION AND PROCESS FOR IMPARTING DURABLE REPELLENCY TO SUBSTRATES

[75] Inventors: Lori P. Engle, Little Canada; Steven J. Hamrock, St. Paul; Mark J. Pellerite, Woodbury, all of Minn.

[73] Assignee: Minnesota Mining and Manufacturing Company, St. Paul, Minn.

[21] Appl. No.: 653,548

[22] Filed: May 24, 1996

Related U.S. Application Data

[60] Provisional application No. 60/000,468, Jun. 23, 1995.

[51] Int. Cl.$^6$ ............................. C09D 185/00; C09C 1/30
[52] U.S. Cl. ............................... 106/287.12; 106/287.13; 106/287.14; 106/287.28; 106/287.16; 106/287.27; 428/404; 428/405; 428/406; 428/407; 523/202; 523/205; 523/209
[58] Field of Search .................... 106/287.13, 287.14, 106/287.27, 287.28; 428/404, 405, 406, 407; 523/202, 213, 276, 209, 205

[56] References Cited

U.S. PATENT DOCUMENTS

| | | | |
|---|---|---|---|
| 2,801,185 | 7/1957 | Iler | 106/288 |
| 2,934,450 | 4/1960 | Brown | 106/287 |
| 3,078,245 | 2/1963 | Heine | 260/29.6 |
| 3,382,097 | 5/1968 | Erby et al. | 117/141 |
| 3,728,151 | 4/1973 | Sherman et al. | 117/138.8 |
| 3,816,229 | 6/1974 | Eierbrauer | 161/67 |
| 3,896,035 | 7/1975 | Schultz et al. | 252/8.75 |
| 3,901,727 | 8/1975 | Loudas | 134/4 |
| 3,901,992 | 8/1975 | Payne et al. | 428/96 |
| 3,916,053 | 10/1975 | Sherman et al. | 428/96 |
| 3,950,588 | 4/1976 | McDougal | 428/288 |
| 3,986,993 | 10/1976 | Vassiliou | 260/23 XA |
| 4,043,923 | 8/1977 | Loudas | 252/8.75 |
| 4,043,964 | 8/1977 | Sherman et al. | 260/29.6 |
| 4,264,484 | 4/1981 | Patel | 260/29.6 |
| 4,482,656 | 11/1984 | Nguyen et al. | 523/212 |
| 4,522,958 | 6/1985 | Das et al. | 523/212 |
| 4,617,057 | 10/1986 | Plueddemann | 106/2 |
| 4,624,889 | 11/1986 | Bries | 428/264 |
| 4,650,784 | 3/1987 | Ramsden et al. | 502/407 |
| 4,822,373 | 4/1989 | Olson et al. | 8/115.6 |
| 4,875,901 | 10/1989 | Payet et al. | 8/115.56 |
| 4,885,332 | 12/1989 | Bilkadi | 524/714 |
| 4,937,123 | 6/1990 | Chang et al. | 428/96 |
| 5,035,803 | 7/1991 | Cohen | 210/656 |
| 5,216,097 | 6/1993 | Allewaert et al. | 526/243 |
| 5,242,719 | 9/1993 | Medford et al. | 427/515 |
| 5,250,322 | 10/1993 | Takahashi et al. | 427/226 |
| 5,274,159 | 12/1993 | Pellerite et al. | 556/485 |
| 5,300,357 | 4/1994 | Gardiner | 428/224 |
| 5,324,566 | 6/1994 | Ogawa et al. | 428/141 |
| 5,372,851 | 12/1994 | Ogawa et al. | 427/255.7 |
| 5,466,486 | 11/1995 | Ogawa et al. | 427/352 |
| 5,466,523 | 11/1995 | Ogawa et al. | 428/333 |
| 5,683,501 | 11/1997 | Tomihisa et al. | 106/491 |

FOREIGN PATENT DOCUMENTS

| | | |
|---|---|---|
| 0 121 078 | 10/1984 | European Pat. Off. . |
| 0 433 906 | 6/1991 | European Pat. Off. . |
| 0 457 939 | 11/1991 | European Pat. Off. . |
| 0 550 915 | 7/1993 | European Pat. Off. . |
| 5-255526 | 10/1993 | Japan . |
| 5-287671 | 11/1993 | Japan . |
| 1298213 | 3/1987 | U.S.S.R. . |
| 1159124 | 7/1969 | United Kingdom . |
| WO 93/01348 | 1/1993 | WIPO . |

OTHER PUBLICATIONS

Tsubokawa et al., "Polymerization of Vinyl Monomers in the Presence of Silica Having Surface Functional Groups," Colloid Polym Sci 271:940–946 (1993).

Tsubokawa et al., "Graft Polymerization of Methyl Methacrylate from Silica Initiated by Peroxide Groups Introduced Onto the Surface," Journal of Polymer Science: Part A: Polymer Chemistry, vol. 30, pp. 2241–2246 (1992).

Tsubokawa et al., "Graft Polymerization of Vinyl Monomers from Inorganic Ultrafine Particles Initiated by Azo Groups Introduced onto the Surface," Polymer Journal, vol. 22, No. 9, pp. 827–833 (1990).

Tsubokawa et al., "Graft Polymerization of Acrylamide from Ultrafine Silica Particles by Use of a Redox System Consisting of Ceric Ion and Reducing Groups on the Surface," Polymer Journal, vol. 21, No. 6, pp. 475–481 (1989).

Gauntt et al., "A Soil Resistant Treatment For Low Gloss Coatings," Journal of Coatings Technology, vol. 63, No. 803, pp. 25–32 (1991).

R.K. Iler, "The Chemistry of Silica, Solubility, Polymerization, Colloid and Surface Properties, and Biochemistry," pp. 415–461, John Wiley & Sons, (1979).

Program Profile for "Colloidal Silica," Nalco Chemical Company, (1989).

Data Sheet for "Ludox® Colloidal Silica," DuPont Company (6 pages).

"Waterproofing and Water/Oil Repellency," Kirk–Othmer Encyclopedia of Chemical Technology, vol. 24, Third Ed., pp. 442–465, John Wiley & Sons, (1984).

"Amorphous Silica," Kirk–Othmer Encyclopedia of Chemical Technology, vol. 20, Third Ed., pp. 762–777, John Wiley & Sons, (1982).

K.K. Dietike, "Chemistry & Technology of UV & EB Formulation for Coatings, Inks & Paints," Photoinitiatorrs for Free Radical and Cationic Polymerisation, vol. 3, pp. 277–299 (1991).

Primary Examiner—Margaret W. Glass
Attorney, Agent, or Firm—Lucy C. Weiss

[57] ABSTRACT

A fluorochemical treatment composition comprises (a) a sol comprising a colloidal dispersion of substantially discrete, substantially monodisperse in size, polymer-grafted, inorganic microparticles in liquid; and (b) at least one fluorochemical. The composition can be used to impart durable water and oil repellency, stain release, and dry soil resistance to a variety of substrates.

30 Claims, No Drawings

COMPOSITION AND PROCESS FOR
IMPARTING DURABLE REPELLENCY TO
SUBSTRATES

CROSS-REFERENCE TO RELATED APPLICATION

This application claims the priority of U.S. Provisional Patent application Ser. No. 60/000,468, filed on Jun. 23, 1995.

FIELD OF THE INVENTION

This invention relates to compositions and processes for imparting water and oil repellency and/or stain and soil resistance to substrates such as, e.g., carpets, textiles, paper, and leather.

BACKGROUND OF THE INVENTION

Fluorochemicals are widely used to impart water and oil repellency as well as dry soil resistance to substrates, particularly fibrous substrates such as carpets. The fluorochemicals thereby enable the substrates to retain their original aesthetic appeal. But many fluorochemical treatments lack durability.

For example, fluorochemicals which have high glass transition temperatures can flake from treated substrates when subjected to abrasion during use. This results in unprotected areas of substrate which thereafter fail to resist staining and soiling. Even fluorochemical treatments which are less brittle and prone to flaking often cannot withstand cleaning operations.

Thus, there is a need in the art for fluorochemical treatments which can provide durable water and oil repellency and durable dry soil resistance. Such treatments should preferably also possess durable stain release properties, and, in view of current environmental concerns, the treatments should be deliverable from water rather than from organic solvent.

SUMMARY OF THE INVENTION

Briefly, in one aspect, this invention provides a fluorochemical treatment composition which can be used to impart durable water and oil repellency, durable stain release, and durable dry soil resistance to substrates, e.g., carpets, fabrics (both woven and non-woven), papers, wood, concrete, and leather. The composition comprises (a) a sol comprising a colloidal dispersion of substantially discrete, substantially monodisperse in size, polymer-grafted, inorganic microparticles in liquid; and (b) at least one fluorochemical. Microparticles having polymodal size distributions prepared from blends of monodisperse distributions can also be utilized in forming the sol. The sol preferably comprises an aqueous dispersion of polymer-grafted silica microparticles, the polymer comprising polymerized units of at least one free-radically polymerizable, ethylenically-monounsaturated monomer. Preferably, the fluorochemical comprises at least one fluoroaliphatic or fluoroalicyclic group and is attached to the microparticles. As used herein, "polymer-grafted microparticles" are microparticles having linear or branched, substantially uncrosslinked polymer chains covalently bonded at essentially only one end to the microparticle (through surface-attached coupling agent).

The composition of the invention can be used to impart surprisingly durable water and oil repellency, stain release, and dry soil resistance to a variety of substrates. And, since the composition can be water-based, it satisfies the need in the art for durable fluorochemical treatments which are environmentally friendly.

In other aspects, the invention also provides one-step and two-step treatment processes for imparting durable water and oil repellency, stain release, and dry soil resistance properties; a treatment composition useful for imparting durable stain release and dry soil resistance, the composition comprising a sol comprising a colloidal dispersion of substantially discrete, substantially monodisperse in size, polymer-grafted, inorganic microparticles in liquid (preferably, water or liquid comprising water; more preferably, water); a treatment process for providing substrates with durable stain release and dry soil resistance properties; and treated articles comprising the treatment compositions of the invention or the corresponding dry compositions.

DETAILED DESCRIPTION OF THE INVENTION

Inorganic microparticles suitable for use in the compositions of the invention are colloidal in size (e.g., having an average particle diameter in the range of from about 1 nanometer (1 millimicron) to about 200 nanometers. Colloidal silica is preferred, but other colloidal metal oxides, e.g., colloidal titania, colloidal alumina, colloidal zirconia, colloidal vanadia, colloidal chromia, colloidal iron oxide, colloidal antimony oxide, colloidal tin oxide, and mixtures thereof, can also be utilized. The colloidal microparticles can comprise essentially a single oxide such as silica or can comprise a core of an oxide of one type (or a core of a material other than a metal oxide) on which is deposited an oxide of another type. Generally, the microparticles can range in size (average particle diameter) from about 1 nanometer to about 200 nanometers, preferably from about 1 nanometer to about 100 nanometers, more preferably from about 2 nanometers to about 75 nanometers.

It is also preferable that the colloidal microparticles be relatively uniform in size (have a substantially monodisperse size distribution or a polymodal distribution obtained by blending two or more substantially monodisperse distributions) and remain substantially non-aggregated (substantially discrete), as microparticle aggregation can result in precipitation, gellation, or a dramatic increase in sol viscosity and can reduce both adhesion to substrate and optical clarity. Thus, a particularly desirable class of microparticles for use in preparing the compositions of the invention includes sols of inorganic microparticles (e.g., colloidal dispersions of inorganic microparticles in liquid media), especially sols of amorphous silica. Unlike fumed silica, which comprises irregular aggregates of colloidal particles, such sols are substantially monodisperse in size and shape and thus enable the preparation of compositions exhibiting good optical clarity and smoothness and, surprisingly, good adhesion to substrates. Such sols can be prepared by a variety of techniques and in a variety of forms which include hydrosols (where water serves as the liquid medium), organosols (where organic liquids are used), and mixed sols (where the liquid medium comprises both water and an organic liquid). See, e.g., the descriptions of the techniques and forms given in U.S. Pat. Nos. 2,801,185 (Iler) and 4,522,958 (Das et al.), which descriptions are incorporated herein by reference, as well as those given by R. K. Iler in *The Chemistry of Silica*, John Wiley & Sons, New York (1979).

Due to their surface chemistry, low cost, and environmental considerations, silica hydrosols are preferred for use in preparing the compositions of the invention. Such hydrosols are available in both acidic and basic forms and in a variety of particle sizes and concentrations from, e.g., Nyacol Products, Inc. in Ashland, Md.; Nalco Chemical Company in Oakbrook, Ill.; and E. I. duPont de Nemours and Company in Wilmington, Del. Concentrations of from about 2 to about 50 percent by weight of silica in water are generally useful. If desired, silica hydrosols can be prepared, e.g., by partially neutralizing an aqueous solution of an alkali metal silicate with acid to a pH of about 8 or 9 (such that the resulting sodium content of the solution is less than about 1 percent by weight based on sodium oxide). Other methods of preparing silica hydrosols, e.g., electrodialysis, ion exchange of sodium silicate, hydrolysis of silicon compounds, and dissolution of elemental silicon are described by Iler, supra.

In preparing the compositions of the invention, a sol of polymer-grafted microparticles can generally be prepared first and then, if water and oil repellency are desired, combined with at least one fluorochemical. Preparation of the sol generally requires that at least a portion of the surface of the inorganic microparticles be modified by chemical reaction (or strong physical interaction) with a coupling agent. Suitable coupling agents are not only capable of reacting (or strongly interacting) with chemical groups on the surface of the microparticles, but also comprise at least one functional group, e.g., —$CH_2SH$, —$CH_2NH_2$, etc., which can function as a chain transfer site for free radical polymerization (a chain transfer group).

For example, silica microparticles can be treated with hydrolyzable, chain transfer group-containing organosilanes under conditions such that silanol groups on the surface of the particles chemically bond with hydrolyzed silane groups to produce covalent silicon-oxygen-silicon bonds. The surface of silica (or other metal oxide) particles can also be treated with other chemical compounds, e.g., hydrolyzable, chain transfer group-containing organotitanates, which are capable of attaching to the surface of the particles by a chemical bond (covalent or ionic) or by a strong physical bond, and which comprise at least one functional group, e.g., —$CH_2SH$, —$CH_2NH_2$, etc., which can function as a chain transfer site for free radical polymerization.

Treatment with hydrolyzable, chain transfer group-containing organosilanes is generally preferred. A preferred class of such compounds can be represented by the general formula

$$Y\text{—}R\text{—}Si(R^1)_a(X)_{3-a} \qquad (I)$$

(as well as partial hydrolyzates and condensates thereof) wherein Y is a chain transfer group (preferably, a moiety selected from the group consisting of mercapto, amino-containing, oxygen-containing, and halogen-containing groups; more preferably, mercapto); R is a divalent group selected from the group consisting of alkylene groups having from 1 to about 12 carbon atoms and arylene groups having from about 6 to about 12 carbon atoms; X is a hydrolyzable group (preferably, a group selected from the group consisting of halogen, alkoxy groups having from 1 to about 12 carbon atoms and optionally containing from 1 to about 11 ether oxygen atoms, acyloxy, amino, and alkylamino); $R^1$ is selected from the group consisting of lower alkyl groups having from 1 to about 4 carbon atoms and phenyl; and a is an integer of 0 to 2 (preferably, 0).

Representative examples of preferred hydrolyzable, chain transfer group-containing organosilanes include 3-mercaptopropyltrimethoxysilane, 4-mercaptobutyltriethoxysilane, 4-mercaptobutyldimethoxymethylsilane, 6-mercaptohexyltrimethoxysilane, 4-mercaptocyclohexyltrimethoxysilane, 3-aminopropyltrimethoxysilane, 4-aminobutyltriethoxysilane, 4-aminobutyldimethoxymethylsilane, 6-aminohexyltrimethoxysilane, 4-aminocyclohexyltrimethoxysilane, 3-chloropropyltrimethoxysilane, 4-chlorobutyltriethoxysilane, 4-chlorobutyldimethoxymethylsilane, 6-chlorohexyltrimethoxysilane, 4-chlorocyclohexyltrimethoxysilane, N,N-dimethylaminopropyltrimethoxysilane, glycidoxypropyltrimethoxysilane, and mixtures thereof.

In preparing the sols of polymer-grafted microparticles, a hydrosol (e.g., a silica hydrosol), a mixed sol (e.g., a mixed silica sol, wherein the liquid medium comprises an aqueous solution of at least one preferably water-soluble organic solvent such as methanol, ethanol, acetone, tetrahydrofuran, ethylene glycol, propoxyethanol, or the like), or an organosol (e.g., a silica organosol, where the organic liquid medium comprises benzene, toluene, propoxyethanol, dimethyl formamide, isopropanol, ethylene glycol, or the like) can generally be first combined with coupling agent(s) and the resulting combination allowed to react. Heat (and agitation) can be applied to facilitate reaction. (The skilled artisan will recognize that the concentration and/or pH of the sol may require adjustment to enhance the stability (and minimize the viscosity) of the sol during reaction with the coupling agent and, later, with monomer. Coupling agent can generally be used in an amount such that at least a portion of the surface of the microparticles is modified sufficiently to enable effective graft polymerization (upon combination with monomer and initiator).

Preferably, the amount of coupling agent is selected to be, e.g., from about $1\times10^{-4}$ to about $7\times10^{-3}$, preferably from about $2\times10^{-4}$ to about $3\times10^{-3}$, and more preferably from about $3\times10^{-4}$ to about $2\times10^{-3}$ millimoles of coupling agent per square meter of microparticle surface area. The resulting mixture can be agitated and maintained at a temperature of, e.g., from about 20° C. to about 100° C., preferably from about 50° C. to about 100° C. (e.g., for about one to about 24 hours) to enable the reaction (or other interaction) of the coupling agent with chemical groups on the surface of the microparticles. This provides a colloidal dispersion of inorganic microparticles which have surface-attached or surface-bonded organic groups.

One or more free-radically polymerizable, ethylenically-monounsaturated monomers can then be added to the resulting colloidal dispersion of surface-modified microparticles. (Optionally, small amounts of one or more free-radically polymerizable, ethylenically-polyunsaturated monomers can also be added to provide a degree of crosslinking, if desired.) Monomer(s) should generally be added in an amount greater than the molar equivalent of coupling agent utilized. For example, from about 0.001 to about 0.10 mole of monomer(s) per gram $SiO_2$ can be utilized. The resulting mixture (which can include surfactant to enable graft polymerization of water-insoluble monomer in an aqueous medium) can be purged of oxygen, an effective amount of a thermally- or radiation-activatable free radical initiator can be added, and the mixture can then be heated (to a temperature sufficient to decompose the free radical source, e.g., from about 20° C. to about 130° C.) or can be irradiated to effect polymerization of the monomer.

Suitable monomers for use in preparing the polymer-grafted microparticles of the compositions of the invention are free-radically polymerizable, ethylenically-unsaturated monomers (or monomer mixtures). Useful monomers include, for example, ethylenically-unsaturated acids and anhydrides; ethylenically-unsaturated macromers; ethylenically-unsaturated, substituted and unsubstituted esters, amides, and nitriles; vinyl monomers; vinylidene monomers; other olefinic monomers such as styrene, ethylene, tetrafluoroethylene, and hexafluoropropene; fluorochemical-containing acrylates and methacrylates; and heterocyclic monomers.

Representative monomers include, for example, acrylic acid; methacrylic acid; itaconic acid; citraconic acid; aconitic acid; maleic acid; maleic anhydride; fumaric acid; crotonic acid; cinnamic acid; oleic acid; vinyl sulfonic acid; vinyl phosphonic acid; alkyl, cycloalkyl, and fluoroalkyl-containing esters of the foregoing acids, where the alkyl, cycloalkyl, and fluoroalkyl groups have from 1 to about 18 carbon atoms (such as, for example, ethyl, butyl, 2-ethylhexyl, octadecyl, 2-sulfoethyl, 3-sulfopropyl, acetoxyethyl, cyanoethyl, hydroxyethyl, and hydroxypropyl acrylates and methacrylates); amides of the foregoing acids (such as, for example, acrylamide, methacrylamide, methylolacrylamide, and 1,1-dimethylsulfoethylacrylamide); acrylate or methacrylate end-capped polyethylene glycols; acrylonitrile; methacrylonitrile; styrene; α-methylstyrene; p-hydroxystyrene; chlorostyrene; sulfostyrene; N-vinyl pyrrolidone; vinyl acetate; vinyl chloride; vinyl fluoride; vinyl ethers; vinyl sulfides; vinyl toluene; butadiene; isoprene; chloroprene; ethylene; isobutylene; vinylidene chloride; vinylidene fluoride; tetrafluoroethylene; hexafluoropropene; sulfated castor oil; sulfated sperm oil; sulfated soybean oil; and sulfonated dehydrated castor oil. Particularly useful monomers include, for example, alkyl acrylates and methacrylates having from 1 to about 18 carbon atoms, styrene, acrylic acid, methacrylic acid, itaconic acid, acrylamides and methacrylamides, fluorochemical-containing acrylates and methacrylates, and sodium sulfostyrene. Monomers which are not soluble in the liquid medium can be solubilized by the addition of solubilizing organic liquid and/or surfactant in an amount sufficient to provide solution or emulsification of the monomers.

Useful free radical initiators include inorganic and organic peroxides, hydroperoxides, persulfates, azo compounds, redox systems (e.g., a mixture of $K_2S_2O_8$ and $Na_2S_2O_5$), and free radical photoinitiators such as those described by K. K. Dietliker in *Chemistry & Technology of UV & EB Formulation for Coatings, Inks & Paints*, Volume 3, pages 276–298, SITA Technology Ltd., London (1991). Representative examples include hydrogen peroxide, potassium persulfate, t-butyl hydroperoxide, benzoyl peroxide, t-butyl perbenzoate, cumene hydroperoxide, and azobis(isobutyronitrile) (AIBN). The skilled artisan will recognize that the choice of initiator will depend upon the particular reaction conditions, e.g., choice of solvent.

Polymerization of the ethylenically-monounsaturated monomer(s) provides a colloidal dispersion of polymer-grafted microparticles. The microparticles have linear or branched, substantially uncrosslinked polymer chains covalently bonded at essentially only one end to surface-attached coupling agent. (As stated above, a degree of crosslinking (and thus multiple attachment sites) can be imparted by the inclusion of one or more ethylenically-polyunsaturated monomers, if desired.) In order to maximize the durability of coatings derived from the treatment compositions of the invention (comprising the dispersions of polymer-grafted microparticles), monomer(s) can be chosen to correspond to the surface energy of the substrate to which a treatment composition is to be applied. Thus, polar monomers can be utilized for substrates having a high surface energy, and, for substrates having a low surface energy, nonpolar monomers can be selected. Alternatively, monomers can be chosen which are capable of having specific chemical or physical interactions with the substrate.

The colloidal dispersion of polymer-grafted microparticles can be utilized (without any content or addition of fluorochemical) to impart durable dry soil resistance and, in some cases (e.g., when monomer(s) containing carboxylic acid or sulfonic acid groups are utilized), durable stain release to substrates. The dispersion can be diluted to, e.g., about 0.01 to about 20% solids (preferably, to about 0.05 to about 10% solids) in dispersing solvent for application to a substrate, or it can be concentrated (for storage or shipment) to a low solvent content or even to an essentially solventless condition (i.e., having essentially no liquid dispersing medium). Surprisingly, the solventless material can generally be essentially completely re-dispersed in solvent without evidence of aggregation.

If durable water and oil repellency are desired (in addition to durable dry soil resistance and stain release), the colloidal dispersion of polymer-grafted microparticles can be combined with at least one fluorochemical. Optionally, the resulting mixture can be subjected to agitation and/or the application of heat, to encourage the reaction or interaction of the fluorochemical(s) with chemical groups on the surface of the microparticles. (For example, temperatures of from about 20° C. to about 100° C. can be maintained for periods of from one to about 24 hours.) Fluorochemical(s) can generally be added in an amount sufficient to impart the level of repellency desired for a particular application. Fluorochemical(s) which are not soluble in the liquid medium can be solubilized by the addition of solubilizing organic liquid and/or surfactant in an amount sufficient to provide solution or emulsification of the fluorochemical(s).

The resulting fluorochemical-containing treatment composition can be diluted with dispersing solvent to a concentration of, e.g., about 0.01 to about 20% solids for application to a substrate, or it can be concentrated (for storage or shipment) to a low solvent content. If desired, a two-step treatment process can be utilized, in which the colloidal dispersion of polymer-grafted microparticles is first applied to a substrate, followed by application of a composition comprising the fluorochemical(s).

Any of the well-known fluorochemicals that are capable of imparting water and oil repellency can be used in the compositions of the invention. Preferably, the fluorochemical(s) will be capable of chemical reaction or strong physical interaction with chemical groups on the surface of the microparticles to enhance durability, but fluorochemical(s) which do not possess such capabilities can also be utilized.

Suitable blendable fluorochemicals include any of the fluorochemical group-containing polymeric and oligomeric compounds known in the art to impart water and oil repellency to substrates. These polymeric and oligomeric fluorochemical treatments typically comprise one or more fluorochemical groups that contain a perfluorinated carbon chain having from 3 to about 20 carbon atoms, more preferably from about 6 to about 14 carbon atoms. These fluorochemical groups can contain straight chain, branched chain, or cyclic fluorinated alkylene groups or any combination thereof. The fluorochemical groups are preferably free of polymerizable olefinic unsaturation but can optionally contain catenary (i.e., in-chain, bonded only to carbon) heteroatoms such as oxygen, divalent or hexavalent sulfur, or nitrogen. Fully-fluorinated groups are preferred, but hydrogen or chlorine atoms can also be present as substituents, provided that no more than one atom of either is present for every two carbon atoms. It is additionally preferred that any fluorochemical group contain from about 40% to about 80% fluorine by weight, more preferably about 50% to about 78% fluorine by weight. The terminal portion of the group is generally fully-fluorinated, preferably containing at least 7 fluorine atoms, e.g., $CF_3CF_2CF_2$—, $(CF_3)_2CF$—, $SF_5CF_2$—. Perfluorinated aliphatic groups (i.e., those of the formula $CnF_{2n+1}$—) are the most preferred fluorochemical groups.

Representative examples of suitable blendable fluorochemicals include fluorochemical urethanes, ureas, esters, ethers, alcohols, epoxides, allophanates, amides, amines (and salts thereof), acids (and salts thereof), carbodiimides, guanidines, oxazolidinones, isocyanurates, biurets, acrylate and methacrylate homopolymers and copolymers, and mixtures thereof.

Representative blendable fluorochemical group-containing polymers useful in the present invention include fluorochemical acrylate and methacrylate homopolymers or copolymers containing fluorochemical acrylate monomers interpolymerized with monomers such as methyl methacrylate, butyl acrylate, octadecylmethacrylate, acrylate and methacrylate esters of oxyalkylene and polyoxyalkylene polyol oligomers (e.g., diethylene glycol dimethacrylate, polyethylene glycol dimethacrylate, polyethylene oxide diacrylate, and polyethylene glycol monoacrylate), glycidyl methacrylate, ethylene, butadiene, styrene, isoprene, chloroprene, vinyl acetate, vinyl chloride, vinylidene chloride, vinylidene fluoride, acrylonitrile, vinyl chloroacetate, vinylpyridine, vinyl alkyl ethers, vinyl alkyl ketones, acrylic acid, methacrylic acid, 2-hydroxyethylacrylate, N-methylolacrylamide, 2-(N,N,N-trimethylammonium)ethyl methacrylate, and 2-acrylamido-2-methylpropanesulfonic acid (AMPS). The relative amounts of various comonomers used can generally be selected empirically, depending on the substrate to be treated, the properties desired, and the mode of application to the substrate. Useful fluorochemical treatments also include blends of the various fluorochemicals described above.

Also useful in the present invention are blends of fluorochemicals with fluorine-free extender compounds, such as siloxanes, (meth)acrylate and substituted acrylate polymers and copolymers, N-methylolacrylamide-containing acrylate polymers, urethanes, blocked isocyanate-containing polymers and oligomers, condensates or precondensates of urea or melamine with formaldehyde, glyoxal resins, condensates of fatty acids with melamine or urea derivatives, condensates of fatty acids with polyamides and their epichlorohydrin adducts, waxes, polyethylene, chlorinated polyethylene, alkyl ketene dimers, esters, and amides. Blends of these fluorine-free extender compounds can also be used. The relative amount of extender compound to fluorochemical is not critical. However, the overall composition of the fluorochemical treatment generally contains, relative to the amount of solids present in the system, at least about 3 weight percent, preferably at least about 5 weight percent, carbon-bound fluorine in the form of said fluorochemical groups.

Many fluorochemicals, including blends that include fluorine-free extender molecules such as those described above, are commercially available as ready-made formulations. Such products are sold, for example, as Scotchgard™ brand Carpet Protector (manufactured by 3M Co., Saint Paul, Minn.) and as Zonyl™ brand Carpet Treatment (manufactured by E.I. du Pont de Nemours and Company, Wilmington, Del.).

Useful fluorochemicals are described in U.S. Pat. No. 3,728,151 (Sherman et al.), U.S. Pat. No. 3,816,229 (Bierbrauer), U.S. Pat. No. 3,896,035 (Schultz et al.), U.S. Pat. No. 3,901,727 (Loudas), U.S. Pat. No. 3,916,053 (Sherman et al.), U.S. Pat. No. 4,043,923 (Loudas), U.S. Pat. No. 4,043,964 (Sherman et al.), U.S. Pat. No. 4,264,484 (Patel), U.S. Pat. No. 4,624,889 (Bries), and U.S. Pat. No. 5,274,159 (Pellerite et al.), the descriptions of which are incorporated herein by reference.

Preferred fluorochemicals for use in the compositions of the invention are those which are capable of chemical reaction or strong physical interaction with chemical groups on the surface of the microparticles. Most preferred are fluorochemical silanes having at least one hydrolyzable or hydrolyzed group. These are compounds, mixtures of compounds, polymers, or copolymers containing at least one silicon atom bonded to at least one group that is capable of reacting with, e.g., silanol groups present on the surface of silica microparticles. A class of useful fluorochemical silanes can be represented by the following general formula:

$$R_f\text{—}[R^2\text{—}Si(R^1)_a(X)_{3-a}]_d \qquad (II)$$

(as well as partial hydrolyzates and condensates thereof) where $R^1$, X, and a are as defined above for formula I; $R_f$ is a monovalent or divalent, fluoroaliphatic or fluoroalicyclic group containing at least about 4 carbon atoms and at least about 25 (preferably about 50) weight percent fluorine; d is an integer of 1 or 2 (preferably 1); and $R^2$ is a divalent linking group which preferably comprises at least one group selected from the group consisting of arylene (preferably phenylene), and alkylene of 1 to about 12 carbon atoms, which may further comprise one or more divalent groups that are substantially stable against hydrolysis (e.g., —CO—, —CONR$^3$—, —SO$_2$—, —SO$_2$NR$^3$—, —(C$_2$H$_4$O)$_b$—, and —(C$_3$H$_6$O)$_b$—, where b is an integer of 1 to about 4 and $R^3$ is hydrogen or alkyl of 1 to about 4 carbon atoms).

Preferably, $R_f$ is a linear or branched fluoroaliphatic group terminated with a trifluoromethyl group and having from about 4 to about 24 carbon atoms (more preferably, from about 4 to about 12) or is a fluoroalicyclic group having from about 4 to about 24 carbon atoms. $R_f$ can optionally contain catenary ether oxygen atoms (bonded only to carbon atoms) and can contain some hydrogen or chlorine, provided that not more than one atom of either hydrogen or chlorine is present for every two carbon atoms. Most preferably, $R_f$ is a linear or branched, perfluoroaliphatic or perfluoroalicyclic group having from about 4 to about 12 carbon atoms.

Representative examples of useful fluorochemical silanes include the following compounds:
$C_5F_{11}CH_2OCH_2CH_2CH_2Si\,(OCH_2CH_3)_3$
$C_7F_{15}CH_2OCH_2CH_2CH_2Si\,(OCH_2CH_3)_3$
$C_7F_{15}CH_2OCH_2CH_2CH_2SiCl_3$
$C_8F_{17}CH_2CH_2OCH_2CH_2CH_2SiCl_3$
$C_{18}F_{37}CH_2OCH_2CH_2CH_2CH_2SiCl_3$
$CF_3CF(CF_2Cl)CF_2CF_2SO_2N(CH_3)CH_2CH_2CH_2SiCl_3$
$C_8F_{17}SO_2N(CH_2CH_3)CH_2CH_2CH_2Si(OCH_3)_3$
$C_8F_{17}SO_2N(CH_3)CH_2CH_2CH_2Si(OCH_3)_3$
$C_8F_{17}SO_2N(CH_2CH_3)CH_2CH_2CH_2Si(OCH_3)_{av1.9}[(OCH_2CH_2)_{av6.1}OCH_3]_{av1.1}$ $C_7F_{15}CH_2O(CH_2)_3Si(OCH_2CH_2OCH_2CH_2OH)_3$
$C_7F_{15}CH_2CH_2Si(CH_3)Cl_2$
$C_8F_{17}CH_2CH_2SiCl_3$
$Cl_3SiCH_2CH_2CH_2OCH_2(OCF_2CF_2)_8CH_2OCH_2CH_2CH_2SiCl_3$
$CF_3(CF_2C(CF_3)F)_4CF_2C(=O)NHCH_2CH_2CH_2Si(OC_2H_5)_3$
$CF_3O(C_3F_6O)_4(CF_2O)_3CF_2CH_2OC(=O)NHCH_2CH_2CH_2Si(OCH_3)_3$
$Cl_3SiCH_2CH_2OCH_2(CF_2CF_2O)_8(CF_2O)_4CF_2CH_2CH_2SiCl_3$
$C_8F_{17}CONHC_6H_4Si(OCH_3)_3$
$C_8F_{17}SO_2N(CH_2CH_3)CH_2CH_2CH_2Si(OCH_3)_{av1}(OCH_2CH_2(OCH_2CH_2)_2OCH_3)_{av2}$ The fluorochemical silanes can be mixed with other non-fluorinated silanes, if desired. Partial condensates of such mixtures can also be utilized.

Useful fluorochemical silanes can be prepared, e.g., by combining at least one fluorochemical compound having at least one reactive functional group with a silane having from one to about three hydrolyzable groups and at least one alkyl, aryl, or alkoxyalkyl group that is substituted by at least one functional group that is capable of reacting with the functional group of the fluorochemical compound(s). Suitable fluorochemical compounds can be prepared, e.g., by the methods disclosed in U.S. Pat. No. 5,274,159 (Pellerite et al.).

The treatment compositions of the invention can be used to impart durable dry soil resistance, in some cases durable stain release, and (if a fluorochemical-containing composition is utilized) durable water and oil repellency to substrates such as carpets, fabrics (both woven and non-woven), papers, leather, plastics, wood, metals, glass, ceramics, stone, and cement. The compositions can generally be diluted (e.g., to a solids concentration of about 0.01 to about 20 weight percent) and applied to a substrate by any of the customary procedures known in the art, e.g., by padding, spraying, exhaustion, knife-coating, dipping, roll-coating, foam techniques, and the like. (When treating nylon substrates by an exhaustion technique, the pH of the compositions can be adjusted to about 1.5 to about 3 using a nonvolatile acid, and a salting agent can be added.) Other conventional additives, e.g., wetting agents, antistats, stain release agents, biocides, antioxidants, and the like, can be included in the compositions of the invention.

If desired, fiber or yarn substrates can be treated prior to conversion to a finished product such as a carpet or rug. Treated substrates can be allowed to dry at ambient temperature or at elevated temperatures.

The quantity of treatment composition employed can vary within wide limits, depending upon the nature of the substrate, the nature of the components of the composition, and the properties desired. The amount should be sufficient to provide the desired degree of stain release and antisoiling characteristics or these characteristics coupled with oil- and water-repelling characteristics.

Objects and advantages of this invention are further illustrated by the following examples, but the particular materials and amounts thereof recited in these examples, as well as other conditions and details, should not be construed to unduly limit this invention. In the examples, all temperatures are in degrees Centigrade and all parts and percentages are by weight unless indicated otherwise.

EXAMPLES

Test Procedures

Stain Release (SR)

Stain release properties of a carpet sample were characterized by introducing 20 ml of cherry flavored KOOL-AID™ Soft Drink Mix (available from Kraft General Foods, Northfield, Ill.) (or a 0.1 wt % FD&C Red Dye # 40 solution adjusted to pH 3.2 with citric acid) challenge solution into an open ended cylinder (5 cm in height and 5 cm in diameter) placed on the tufted surface of a carpet test sample. If the challenge solution was initially repelled by the carpet, the cylinder or the carpet was tapped until the fluid penetrated into the carpet pile. The cylinder was removed, the stained carpet sample allowed to sit at room temperature (about 22° C.) for 24 hours, after which the carpet sample was rinsed with water until no color was present in the effluent. The carpet sample was then centrifuged to remove most of the water and dried at 65° C. Residual stain (i.e. the degree of reddening) on the dried carpet was measured using a Minolta CR-310 Light Meter, comparing the stained value to an unstained control sample of the same carpet with the stain release treatment. The degree of staining is reported as $\Delta a$ (the difference between the stained and unstained samples), with the lower $\Delta a$ values representing better stain release, or less residual staining of the carpet. (Based on a three dimensional CIE $L^*a^*b^*$ color scale, where $a^*$ represents the red-green vector, $L^*$ the light/dark ratio, and $b^*$ the blue/yellow ratio.)

Dynamic Water Resistance (DWR)

Dynamic water resistance of a carpet sample was determined by inclining a test sample (15.2 cm×30.5 cm) at an angle of 45° from horizontal and impinging deionized (D.I.) water (20 ml) onto the center of the carpet sample through a 5 mm i.d. tube positioned 45.7 cm above the sample. The increase in weight of the test sample provided an indication of its ability to repel water, with lower weight gains indicating better repellency properties.

Oil/Aqueous Repellency (OR/AR)

The ability of a carpet sample to repel oil challenges (OR) was determined using the American Association of Textile Chemists and Colorists (AATCC) Standard Test Method No. 118-1983, which test is based on the resistance of a treated fabric to penetration by oils of varying surface tensions. Oils and their associated rating numbers include:

| AATCC Oil Repellency Rating Number | Oil |
| --- | --- |
| 1 | Mineral Oil |
| C | 85:15 Mineral Oil/Hexadecane (v/v) |
| 2 | 65:35 Mineral Oil/Hexadecane (v/v) |
| 3 | n-Hexadecane |
| 4 | n-Tetradecane |
| 5 | n-Dodecane |
| 6 | n-Decane |
| 7 | n-Octane |
| 8 | n-Heptane |

Five drops of each oil challenge were placed on a carpet sample and the number of drops of each challenge remaining on the carpet surface (i.e. not soaked into the carpet pile) after one minute noted. An "Oil Repellency" number was assigned based on the highest rating number challenge (i.e. lowest surface tension) of which all five test drops did not soak into the carpet sample. The higher the oil rating number, the better the oil repellency properties of the carpet.

The ability of a carpet sample to repel aqueous challenges (AR) was determined with water/isopropyl alcohol test challenges. Test solutions and their rating numbers included:

| Aqueous Challenge Fluid Rating Number | Fluid |
| --- | --- |
| 0 | Water |
| 1 | 90:10 Water/Isopropyl alcohol (v/v) |
| 2 | 80:20 Water/Isopropyl alcohol (v/v) |
| 3 | 70:30 Water/Isopropyl alcohol (v/v) |
| 4 | 60:40 Water/Isopropyl alcohol (v/v) |
| 5 | 50:50 Water/Isopropyl alcohol (v/v) |
| 6 | 40:60 Water/Isopropyl alcohol (v/v) |
| 7 | 30:70 Water/Isopropyl alcohol (v/v) |
| 8 | 20:80 Water/Isopropyl alcohol (v/v) |
| 9 | 10:90 Water/Isopropyl alcohol (v/v) |
| 10 | Isopropyl alcohol |

Five drops of each aqueous challenge fluid were placed on a carpet sample and the number of drops of each fluid remaining on the carpet surface (i.e., not soaked into the carpet pile) after one minute noted. An "Aqueous Repellency" number was assigned based on the highest rating number fluid (i.e., lowest surface tension) of which all five test drops did not soak into the carpet sample. The higher the aqueous rating number, the better the aqueous repellency properties of the carpet.

Elemental Si Analysis

Elemental Si content of treated carpet samples was determined by obtaining a solution of Si containing treated carpet fibers and analyzing the solution for Si by Inductively Coupled Plasma (ICP) analysis.

Sulfuric acid (15 ml) was added to approximately 1 g of treated carpet fibers and the mixture placed on a warm hot plate until the fibers charred. Nitric acid was added to the charred mixture until the mixture turned clear yellow, at which point perchloric acid (3 ml) was added to obtain a colorless sample. The sample was then evaporated to approximately 5 ml, cooled, and the container rinsed with D.I. water. The acid solution and wash were combined and transferred to a plastic volumetric flask (100 ml), hydrofluoric acid (3 ml) added to the solution and D.I. water added to dilute the sample to 100 ml. The sample was then analyzed against Si standards with the same acid matrix using a Thermo Jarrell Ash ICAP 61E spectrophotometer. The Si content was translated to % Solids on Carpet (SOC) of the $SiO_2$/methacrylic acid (MAA) graft based on the assumption that 1 mole Si corresponds to 1 mole $SiO_2$ and all MAA was grafted to silica during the graft polymerization reaction. Si content is reported as ppm Si. In all cases, untreated carpet samples were included in the analysis to verify that other sources of elemental Si (e.g., from silicone oils) were not contributing to the Si content on the treated carpet samples.

Durability Simulation

The durability of carpet treatments toward "steam cleaning" was characterized by soaking a treated carpet in a pH 10 solution of DUPONOL WAQE (a sodium lauryl sulfate based surfactant system, available from Witco Corp., Greenwich, Conn.) under conditions which simulated the effect of multiple "steam cleanings." The surfactant was present at a concentration of 7 ml per liter water, and the solution pH was maintained at 10 with trisodium phosphate. Following the soak, the carpet sample was extensively rinsed with tap water, centrifuged to remove most of the water, and dried at room temperature. The thus-challenged carpet samples were tested for Stain Release, Dynamic Water Repellency, and silica content as described above, the results of the tests being reported as WAQE SR, WAQE DWR, and WAQE ppm Si respectively. Carpet treatments that retain at least about 25% of their original performance after the "WAQE" challenge show reasonable durability toward steam cleaning.

Walk-on Soiling

Treated and untreated (control) carpet squares were mounted on particle board, the mounted samples placed in a commercial location, and the carpet samples soiled by normal foot traffic. The amount of foot traffic was monitored and the position of each test sample within the test location changed daily using a pattern designed to minimize the effects of the carpet sample position and orientation on soiling. Following a specific soil challenge period, measured in numbers of cycles wherein one cycle equals approximately 10,000 foot traffics, the samples were removed and vacuumed to remove unadhered debris. The amount of soil remaining on each sample was determined using calorimetric measurements, with the assumption that the amount of soil on a sample was proportional to the difference in color between the unsoiled sample and the corresponding sample after soiling. The three CIE L*a*b* color coordinates of the unsoiled and subsequently soiled samples were measured using a Minolta CR-310 Chroma Meter with a D65 illumination source. The color difference value, $\Delta E$, was calculated using the following equation:

$$\Delta E = [(\Delta L^*)^2 + (\Delta a^*)^2 + (\Delta b^*)^2]^{1/2}$$

where: $\Delta L^* = L^*_{soiled} - L^*_{unsoiled}$
$\Delta a^* = a^*_{soiled} - a^*_{unsoiled}$
$\Delta b^* = b^*_{soiled} - b^*_{unsoiled}$ $\Delta E$ values calculated from these calorimetric measurements have been shown to be qualitatively in agreement with values from older, visual evaluations such as the soiling evaluation suggested by the AATCC, but possess the additional advantages of having a degree of precision and of being unaffected by evaluation environment or operator. Final $\Delta E$ values for each sample were calculated as an average of between five and seven replicates.

The performance improvement of a sample above the untreated control sample, reported as $\Delta\Delta E$, was calculated using the equation below:

$$\Delta\Delta E = \Delta E_{soiled\ untreated\ control} - \Delta E_{soiled\ treated}$$

Coupling Agent Treated Silica Precursor Preparation

Silica sols having chain transfer coupling agent treatments were prepared according to the following general procedure:

Coupling agent addition to the silica sol suspension was typically carried out at a silica sol concentration of 5–20% solids. Sols available at concentrations higher than 20% solids were typically diluted with D.I. water to obtain a more workable concentration (i.e., a concentration which would not gel or become too viscous during the coupling agent treatment or subsequent graft polymerization). The pH of the suspension was adjusted to about 2.5–3.5 by the addition of acetic acid, sulfamic acid, or sulfuric acid prior to the addition of the coupling agent. Silane coupling agent, as indicated in Table 1, was added to the acidic suspension and the resulting mixture stirred at 75°–80° C. for 16–24 hours. (Initially the silane coupling agent formed an oily film on the surface of the aqueous suspension but after the 16–24 hour reaction the mixture was homogeneous.) The amount of silane coupling agent used in this reaction was adjusted to correspond to the mmol coupling agent/g silica sol ratio indicated in Table 1. Subsequent to the completion of the reaction, the reaction mixture was diluted with additional D.I. water to produce an approximately 2.5–7.5% solids, preferably about 3% solids, suspension of the coupling agent treated silica sols.

TABLE 1

Coupling Agent Treated Precursors

| Precursor # | Silica | Coupling Agent | mmol Coupling Agent/g Silica |
|---|---|---|---|
| P-1 | NALCOAG ™ 1042[1] | Mercaptopropyl-trimethoxysilane[6] | 0.05 |
| P-2 | NALCOAG ™ 1042 | Mercaptopropyl-trimethoxysilane | 0.25 |
| P-3 | NALCOAG ™ 1042 | Glycidoxypropyl-trimethoxysilane[7] | 0.05 |
| P-4 | NALCOAG ™ 1056[2] | Mercaptopropyl-trimethoxysilane | 0.05 |
| P-5 | NALCOAG ™ 2326[3] | Mercaptopropyl-trimethoxysilane | 0.05 |
| P-6 | NALCOAG ™ 2329[4] | Mercaptopropyl-trimethoxysilane | 0.014 |
| P-7 | CAB-O-SPERSE ™ S 3295[5] | Mercaptopropyl-trimethoxysilane | 0.10 |

[1]A colloidal SiO$_2$ suspension having a mean particle size of 20 nm, available from Nalco Chemical Co., Chicago, IL, as a 34% solids suspension in water at pH 3.2 and a viscosity of <10 cp.
[2]A colloidal SiO$_2$ core with an Al$_2$O$_3$ shell (~4% Al$_2$O$_3$) suspension having a mean particle size of 20 nm, available from Nalco Chemical Co. as a 30% solids suspension in water at pH 4.2 and a viscosity of 15 cp.
[3]A colloidal SiO$_2$ suspension having a mean particle size of 5 nm, available from Nalco Chemical Co. as a 15% solids suspension in water at pH 9.2 and a viscosity of 5 cp.
[4]A colloidal SiO$_2$ suspension having a mean particle size of 75 nm, available from Nalco Chemical Co. as a 30% solids suspension in water at pH 9.2 and a viscosity of 10 cp.
[5]An amorphous fumed silica available from Cabot Corp., Cab-O-Sil Division, Tuscola, IL as a 15% solids aqueous slurry at pH 9.5–10.
[6]Mercaptopropyltrimethoxysilane (MPTMS), available from Aldrich Chemical Co., Milwaukee, WI.
[7]Glycidoxypropyltrimethoxysilane (GPTMS), available from Aldrich Chemical Co.

Examples 1–10

Polymer grafted silica sols were prepared according to the following general procedure:

Monomer(s) in the silica/monomer ratios indicated in Table 2 were added to approximately 3% suspensions of the indicated precursor, the reaction mixture deoxygenated by a N$_2$ purge for about 5 minutes and then heated to 65°–70° C. under a N$_2$ atmosphere, and initiator (e.g., potassium persulfate or t-butyl hydroperoxide) added to the reaction mixture, typically at an approximately 1% to monomer concentration. The reaction mixture was maintained at 65°–70° C. under a N$_2$ atmosphere, with stirring, for 24 hours to complete the graft polymerization. The resulting clear, bluish suspension was free from the smell of monomer and was used without further purification.

TABLE 2

Polymer Grafted Silica Sols

| Example # | Precursor # | Monomer(s) | Silica:Monomer Ratio (wt:wt) |
|---|---|---|---|
| 1 | P-1 | Methacrylic Acid[1] | 1:1 |
| 2 | P-1 | Methacrylic Acid | 1:1.5 |
| 3 | P-1 | Methacrylic Acid | 1:2 |
| 3a | P-1 | Methacrylic Acid | 2:1 |
| 4 | P-2 | Methacrylic Acid | 1:1 |
| 5 | P-3 | Methacrylic Acid | 1:1 |

TABLE 2-continued

Polymer Grafted Silica Sols

| Example # | Precursor # | Monomer(s) | Silica:Monomer Ratio (wt:wt) |
|---|---|---|---|
| 6 | P-4 | Methacrylic Acid | 1:1 |
| 7 | P-5 | Methacrylic Acid | 1:1 |
| 8 | P-6 | Methacrylic Acid | 1:1 |
| 9 | P-1 | Methacrylic Acid: Butyl acrylate[2] (83:17)[3] | 1:1.7 |
| C-1[4] | P-7 | Methacrylic Acid | 1:1 |

[1]Methacrylic Acid (MAA), available from Aldrich Chemical Co. Inhibitor was removed from the MAA just prior to the graft polymerization by passing it through a column of De-Hibit-100 macroreticular ion exchange resin (available from Polysciences, Inc., Warrington, VA, in the form of water-saturated chloride beads) or by distillation.
[2]Butyl Acrylate (BA), available from Aldrich Chemical Co. Inhibitor was removed from the BuA in the same manner it was removed from MAA.
[3]This reaction mixture also contained 3M ™ Stain Release Concentrate FC-369 (11 parts solids relative to the total of MAA, SiO$_2$, and BuA), a sulfonated Novalak resin available from 3M Co., St. Paul, MN.
[4]This example is included as a comparative example where the silica particles comprise agglomerations of smaller particles rather than the substantially discrete particles of the present invention.

Comparative Example C-2

D.I. water (450 g) was added to NALCOAG™ 1042 (36.75 g) to produce an approximately 2.5% solids colloidal suspension. Freshly distilled methacrylic acid (12.5 g) was added to the silica suspension, the resulting mixture deoxygenated by a N$_2$ purge for about 5 minutes, the mixture heated to 80° C. under a N$_2$ atmosphere, and t-butyl hydroperoxide (1.5 g of a 70% actives aqueous solution, available from Aldrich Chemical Co.) added to the mixture. The resulting mixture was maintained at 80° C. under a N$_2$ atmosphere, with stirring, for 24 hours to complete polymerization. The resulting clear, bluish suspension was free from the smell of monomer and was used without further purification.

Carpet Treatment Procedures

The polymer grafted silica sols of the present invention were applied to various nylon 6 or nylon 66 carpets by the following exhaustion or flexnip procedures.

Exhaustion Application (EX)

A 1000 ml stainless steel beaker was charged with 500 g of a 1% solids (wt) aqueous dispersion of the composition to be exhausted onto the carpet sample. Optionally, MgSO$_4$ (0.5 wt %) and/or Karawet™ DOSS (0.1 wt %; dioctylsulfosuccinate, available from Rhone Poulenc, Baltimore, Md.) was added to the dispersion. The pH of the dispersion was adjusted to 2 with a 10 wt % solution of sulfamic acid and the beaker then partially immersed in an oil bath at 100° C. When the temperature of the dispersion reached 76° C., an approximately 10 g sample of a nylon carpet (a light blue nylon 6,6 carpet having a face weight of about 1.2 kg/M$^2$) was completely immersed in the dispersion and the carpet agitated in the suspension for 15 minutes. The carpet sample was subsequently removed from the bath and exhaustively rinsed in D.I. water. Cloth towels were applied to the sample with hand pressure to absorb most of the water from the carpet. At this point, the sample was either dried at room temperature and submitted for Si analysis or sprayed with an aqueous solution of a water soluble fluorocarbylalkoxysilane (FCSi) (prepared essentially as described in Example 6 of U.S. Pat. No. 5,274,159

(Pellerite et al.), the description of which is incorporated herein by reference), as described below.

Flexnip Application (FN)

Weighed carpet samples (about 15 cm×30 cm) were soaked in D.I. water for at least 5 minutes before being subjected to forced steam in a Mathis Laboratory Steamer Type DH (available from Werner Mathis U.S.A., Inc., Concord, N.J.) at steam temperature of approximately 100° C. for 2 minutes with the tuft side of the carpet sample facing upward as the sample passed through the steamer. The steamed carpet was centrifuged to 10–15% wet pickup weight based on the dry weight of the carpet and the samples stored in a sealed plastic bag (up to a maximum of 3 hours) until a treatment was applied.

The treatment bath was sized so that the carpet sample would absorb the total bath (typically 4–5 times the weight of the dry carpet sample). The desired % Solids on Carpet (% SOC) was calculated based on the carpet weight and the appropriate concentrations of treatment components (e.g., grafted silica sol, wetting agents, etc.) added to D.I. water, the bath diluted to the desired weight, and the pH of the bath adjusted to 2 with a 10% aqueous solution of sulfamic acid. Typically, 1% SOC of the grafted silica was mixed in the bath along with 0.5% SOC of $MgSO_4$. (For example, to obtain a 1% SOC treatment on a 100 g carpet sample, 1 g of grafted silica solids and 0.5 g $MgSO_4$ were added to the water for a total bath weight of 500 g). The bath was poured into a 6"×12" pan and the steamed carpet immersed tuft side down in the bath for 1 minute with a weight placed on the carpet sample to facilitate fluid pickup. The carpet was then placed tuft side down in the steamer, any remaining bath poured on top of the carpet, and the carpet steamed a second time using the same conditions as above. Immediately following steaming, the carpet was dipped in approximately 2 liters of D.I. water three times, then centrifuged to 10–15% wet pickup based on the dry weight of the carpet.

Fluorochemical treatments were applied to the treated carpets immediately following the flexnip treatment or, alternatively, the wet treated samples were stored in sealed plastic bags up to a maximum of 3 hours between the flexnip and spray operations.

Fluorochemical Component Application

The fluorochemical component of the carpet treatment compositions was applied to damp carpet samples following the exhaustion or flexnip application of the grafted silica component. An aqueous solution of the fluorochemical component, with solids adjusted so as to produce approximately 500 ppm elemental F pickup, based on the dry weight of the sample, with a 15% wet weight add-on, was applied to the damp carpet test sample as a topical spray. The carpet samples were dried at 121° C. and allowed to stand at room temperature for at least 8 hours before testing.

Examples 10–40 and 46–54

Carpet samples were prepared using the grafted silica and grafted silica/fluorochemical compositions of the present invention and the application techniques described above, as indicated in Table 3.

TABLE 3

Carpet Sample Preparation

| Example # | Carpet Type | Grafted Si Example # | Application Process | % Solids on Carpet | Fluorochemical Component |
|---|---|---|---|---|---|
| Control-1[1] | Carpet 1[2] | — | — | — | — |
| 10 | Carpet 1 | 1 | FN | 1.0 | none |
| 11 | Carpet 1 | 1 | FN | 1.0 | FCSi[3] |
| Control-2[1] | Carpet 1 | — | — | — | — |
| 12 | Carpet 1 | 1 | FN | 1.0 | FC-1373M[4] |
| 13 | Carpet 1 | 1 | FN | 1.0 | FC-1355[5] |
| 14 | Carpet 1 | 9 | FN | 1.0 | FC-1373M |
| 15 | Carpet 1 | 9 | FN | 1.0 | FC-1355 |
| Control-3[1] | Carpet 1 | — | — | — | — |
| 16 | Carpet 1 | 1 | FN | 0.2 | FCSi |
| 17 | Carpet 1 | 7 | FN | 1.0 | FCSi |
| 18 | Carpet 1 | 7 | FN | 0.2 | FCSi |
| 19 | Carpet 2[6] | 1 | FN | 1.0 | FCSi |
| 20 | Carpet 3[7] | 1 | FN | 1.0 | FCSi |
| 21 | Carpet 2 | 2 | FN | 1.0 | FCSi |
| 22 | Carpet 3 | 2 | FN | 1.0 | FCSi |
| 23 | Carpet 2 | 2 | FN | 1.5 | FCSi |
| 24 | Carpet 3 | 2 | FN | 1.5 | FCSi |
| 25 | Carpet 2 | 3 | FN | 1.0 | FCSi |
| 26 | Carpet 3 | 3 | FN | 1.0 | FCSi |
| 27 | Carpet 2 | 3 | FN | 2.0 | FCSi |
| 28 | Carpet 3 | 3 | FN | 2.0 | FCSi |
| 29 | Carpet 2 | 4 | FN | 1.0 | FCSi |
| 30 | Carpet 3 | 4 | FN | 1.0 | FCSi |
| 31 | Carpet 2 | 6 | FN | 1.0 | FCSi |
| 32 | Carpet 1 | 6 | FN | 1.0 | FCSi |
| 33 | Carpet 2 | 8 | FN | 1.0 | FCSi |
| 34 | Carpet 1 | 8 | FN | 1.0 | FCSi |
| 35 | Carpet 3 | 8 | FN | 1.0 | FCSi |
| Comp. C-3[8] | Carpet 1 | C-1 | FN | 1.0 | FCSi |
| Comp. C-4[8] | Carpet 4[9] | C-1 | EX | — | — |
| 36 | Carpet 4 | 5 | EX | — | — |
| Comp. C-5[10] | Carpet 4 | — | — | — | — |
| 37 | Carpet 4 | 1 | EX | — | none |
| Comp. C-6 | Carpet 4 | C-2 | EX | — | none |
| Control-4[1] | Carpet 4 | — | — | — | — |
| 38 | Carpet 4 | 3[11] | EX | — | none |
| 40 | Carpet 4 | 39 | EX | — | none |
| 46 | Carpet 1 | 3 | FN | 1.0 | FCSi |
| 47 | Carpet 1 | 3 | FN | 1.5 | FCSi |
| 48 | Carpet 1 | 3a | FN | 0.75 | FCSi |
| 49 | Carpet 1 | 3a | FN | 1.0 | FCSi |
| 50 | Carpet 1 | 4 | FN | 1.0 | FCSi |
| 51 | Carpet 3 | 3a | FN | 0.75 | FCSi |
| 52 | Carpet 3 | 3a | FN | 1.0 | FCSi |
| 53 | Carpet 3 | 3 | FN | 1.5 | FCSi |
| 54 | Carpet 3 | 6 | FN | 1.0 | FCSi |

[1]Untreated sample of carpet.
[2]An off-white colored nylon 66 carpet having a face weight of about 1.3 kg/m². Used for walk-on soiling evaluations because it provided good contrast between soiled and unsoiled areas and consistent reproducibility between tests.
[3]A fluorocarbylalkoxysilane prepared essentially as described in Example 6 of U.S. Pat. No. 5,274,159 (Pellerite. et. al.), the description of which is incorporated herein by reference.
[4]Scotchgard ™ FC-1373M Commercial Carpet Protector, a 31% (wt) solids aqueous treatment containing a fluorochemical urethane, available from 3M Co.
[5]Scotchgard ™ FC-1355 Commercial Carpet Protector, an aqueous fluoroaliphatic polymer treatment containing 45.6% solids, available from 3M Co.
[6]A light blue colored nylon 6 carpet having a face weight of about 1.2 kg/m² used for stain resistance evaluations.
[7]A light blue colored nylon 66 carpet having a face weight of about 1.4 kg/m² used for oil and water repellency evaluations.
[8]Silica particles used in this treatment were agglomerates of smaller silica particles rather than the substantially discrete particles of the present invention.
[9]A light blue nylon 6,6 carpet having a face weight of about 1.2 kg/m².
[10]NALCOAG ™ 1042 (1% $SiO_2$ solids in bath) exhausted onto Carpet 4.
[11]The treatment suspension of Example 3 was evaporated to dryness in a rotary evaporator and redispersed in water by the same procedure used to redisperse the silica sol produced in Example 39.

The performance characteristics of the protective compositions of the present invention on the above prepared carpet samples were characterized using the above described test methods, the results of which are reported in Table 4.

Performance data for the protected carpets described in Examples 10–40 and 46–54 has been grouped according to carpet type and the specific performance feature being tested (i.e., Carpet 1 was used for walk on soiling evaluations, Carpet 2 was used for stain resistance evaluations, Carpet 3 was used for oil and water repellency evaluations, and Carpet 4 was used to determine Si levels before and after exhaustion treatment).

Co.) were added to freshly dried methanol (198 g; distilled over $CaH_2$) and the mixture deoxygenated by a N2 purge for approximately 10 minutes. The reaction mixture was then heated to reflux, with stirring and under a $N_2$ blanket, for 24 hours. NALCOAG™ 1042 (29.4 g) was added to 50 g of the methanol polymer solution and the reaction mixture heated at reflux for 24 hours. The resulting mixture was evaporated to dryness in a rotary evaporator to produce a light yellow solid having a 0.06 mmol MPTMS/g $SiO_2$ ratio and a 2:1 $SiO_2$:MAA ratio.

5 g of the solid was added to 495 g D.I. water and sufficient $HO_3SNH_2$ added to adjust the pH to 2 and the

TABLE 4

PROTECTIVE TREATMENT PERFORMANCE

| Example # | Walk-On Soiling ($\Delta\Delta E$) | SR ($\Delta a$) | WAQE SR ($\Delta a$) | DWR (g) | WAQE DWR (g) | Kit OR/AR | ppm Si | WAQE ppm Si |
|---|---|---|---|---|---|---|---|---|
| 10 | 3.69 | | | | | | | |
| 11 | 4.87 | 15.6 | 35.9 | 5.1 | 10.9 | 2/2 | 1260 | 831 |
| 12 | 4.58 | 11.9 | 27.7 | | | | 1382 | 1385 |
| 13 | 3.51 | 16.4 | 32.4 | 13.8 | 19.5 | | 1375 | 1170 |
| 14 | 2.87 | 23.1 | 30.9 | | | | 893 | 693 |
| 15 | 3.48 | 26.4 | 32.3 | 10.8 | 13.5 | | 1069 | 870 |
| 16 | 1.72 | | | | | 3/4 | | |
| 46 | 4.60 | | | | | C/1 | 679 | 297 |
| 47 | 5.97 | | | | | C/1 | 1492 | 671 |
| 48 | 5.1 | | | | | C/1 | 1343 | 1088 |
| 49 | 4.78 | | | | | 1/1 | 1791 | 895 |
| 50 | 2.95 | | | | | 2/1 | 422 | 135 |
| 17 | 3.09 | | | 6.3 | | 3/2 | | |
| 18 | 1.5 | | | 4.8 | | 4/5 | | |
| 32 | 4.35 | 18.4 | 37 | 4.4 | | 3/1 | 497 | 329 |
| 34 | 4.42 | 36.8 | 38.2 | 4.9 | | 2/1 | 1191 | 497 |
| Comp. C-3 | | 33.8 | 42.4 | 5.2 | 17.2 | 3/2 | 270 | 234 |
| 19 | | 5.5 | 23.7 | | | | 1037 | 755 |
| 21 | | 1.2 | 20.7 | | | | 708 | 285 |
| 23 | | 1.3 | 7.1 | | | | | |
| 25 | | 1.1 | 13 | | | | 415 | 198 |
| 27 | | 0.8 | 1.4 | | | | 1689 | 1097 |
| 29 | | 2.4 | 10.8 | 7.4 | 17.8 | 3/2 | 1337 | 679 |
| 31 | | 1.5 | 9.7 | 3.4 | | 3/F‡ | | |
| 33 | | 15.5 | 17.8 | 3.8 | | 3/F‡ | | |
| 20 | | 15.24 | 22 | 3.5 | 5.3 | C/2 | 897 | 727 |
| 51 | | | | 3.9 | 6.7 | C/1 | 1823 | 1595 |
| 52 | | | | 3.5 | 5.3 | C/1 | 1463 | 1179 |
| 22 | | 7.6 | 19.8 | 3.7 | | | 807 | |
| 24 | | 12.9 | 19.9 | 3.8 | | | 640 | |
| 26 | | 13 | 20.8 | 3.5 | 15.1 | 1/1 | 425 | 238 |
| 53 | | | | 5.6 | 14.7 | 2/1 | 1746 | 1421 |
| 28 | | 16.1 | 16.2 | 5.8 | | | 1069 | 871 |
| 30 | | 12.3 | 23.6 | 4.1 | 10.9 | C/2 | 1153 | 948 |
| 35 | | 12.6 | 17.3 | 3.5 | 14.5 | 1/1 | 1271 | 1026 |
| 54 | | | | 3 | 4.7 | 3/1 | 354 | 351 |
| 36 | | | | | | | 507 | |
| 37 | | | | | | | 4957 | |
| 38 | | | | | | | 5181 | |
| 40 | | | | | | | 916 | |
| Control-1 | 0* | | | | | | | |
| Control-2 | 0* | 14.4 | | | | | | |
| Control-3 | 0* | | | 18.6 | | F/F‡ | | |
| Control-4 | | | | | | | 154 | |
| Comp. C-4 | | | | | | | 292 | |
| Comp. C-5 | | | | | | | 906 | |
| Comp. C-6 | | | | | | | 65 | |

*By definition, $\Delta\Delta E$ for controls is 0.
‡F = No observed repellency to any challenge fluid.

Example 39

Methacrylic acid dried over 5 Å molecular sieves and free from inhibitor (22.4 g), 3-mercaptopropyltrimethoxysilane (MPTMS; 0.56 g), and initiator (0.23 g, azobis(isobutyronitrile)(AIBN), available from Aldrich Chemical solution used to treat carpet samples via the previously described exhaustion application technique.

Example 41

A treatment solution was prepared by adjusting 500 g of a 2 wt. percent solids suspension of the grafted silica of Example 1 to pH 6 using NH$_4$OH and mixing the suspension with a solution of 10 g of FCSi in 490 g D.I. water to produce a clear suspension. A portion of the suspension was applied to a wooden tongue depressor and rubbed into the wood using finger pressure and the depressor subsequently dried at 140° C. for 3 minutes. After cooling to ambient temperature, the depressor demonstrated excellent dynamic repellency in a stream of water impinging on the depressor from a height of approximately 30 cm. Oil repellency testing on the treated depressor demonstrated beading through oil # 3 and hold out through oil # 6 after 30 seconds.

The treatment suspension was applied to a second depressor in a similar manner, but the depressor was allowed to dry at ambient temperature over night. The second depressor also demonstrated good dynamic water repellency.

Example 42

NALCOAG™ TX-8800 ( a colloidal silica dispersion having a mean particle size of 20 nm, available from Nalco Chemical Co. as a 29% solids suspension in isopropanol) was mixed with 3-mercaptopropyltrimethoxysilane (1.423 g, 0.25 mmol/g silica) and the resulting mixture heated, with stirring, at 65° C. overnight. 17.01 g of this dispersion was mixed with a solution of 13.5 g of Fluorad™ Fluorochemical Acrylate FX-13 (available from 3M Co., St. Paul, Minn.) and 1.5 g of methacrylic acid in acetone (65 ml) and the mixture heated to 65° C. The reaction mixture was deoxygenated by a N$_2$ purge for approximately 5 minutes and tert-butyl hydroperoxide (0.215 g of 70% active compound) added and heating, with stirring, continued for 22 hours. The resulting reaction mixture was free from monomer odor and had a 3:1 ratio of grafted polymer/silica at a 20% solids suspension.

A wooden tongue depressor was dipped into the suspension, excess liquid removed by wiping the depressor with a paper tissue, and the depressor allowed to dry at least 15 minutes at room temperature before testing for repellency. Oil repellency on the treated depressor demonstrated beading through oil # 3 and hold out through oil # 6. Aqueous kit repellency for the treated depressor demonstrated beading through oil # 1 and hold out through oil # 3. The depressor demonstrated excellent dynamic repellency in a stream of water impinging on the depressor from a height of approximately 30 cm.

Example 43

A treatment solution was prepared substantially according to the procedure of Example 41 wherein an aqueous solution of FCSi (1.0 g FCSi in 49 g D.I. water) was added to the polymer grafted silica of Example 1, previously diluted with D.I. water to 2% solids (50 g), to produce 100 g of an approximately 2% solids dispersion of a FCSi/polymer grafted silica suspension. The FCSi/polymer grafted silica was concentrated (rotovaporized) to an approximately 10% solids dispersion, from which a 2.02 g aliquot was removed for repellency tests. The remainder of the dispersion was further concentrated (rotovaporized) to an approximately 50% dispersion which had the consistency of a waxy solid. Both the 10% and 50% solids dispersions were successfully redispersed back to 2% by solids dispersion with addition of the appropriate amount of D.I. water.

Tongue depressors were treated with the redispersed FCSi/polymer grafted silica samples and tested for oil kit repellency and dynamic water repellency essentially as described in Example 41. Depressors treated with the redispersions demonstrated oil kit repellency bead up through 4 and holdout through 6 and good dynamic water repellency.

Example 44

Acetone (65.6 g) was added to a 17% solids dispersion of Precursor P-1 (29.4 g) to obtain an approximately 5% solids, mixed solvent colloidal dispersion. Methyl methacrylate (5.0 g) was added dropwise to the dispersion while stirring, the resulting mixture heated to 65° C. under a N$_2$ atmosphere and then deoxygenated by a N$_2$ purge for 5 minutes. t-Butyl hydroperoxide (0.071g of 70% solids aqueous solution, available from Aldrich Chemical Co.) was added and the reaction mixture heated at 65° C., under a N$_2$ atmosphere, for 24 hours to produce a clear suspension of polymer grafted silica. A solution of FCSi (0.250 g) in acetone (4.75 g) was added drop wise to an aliquot (5 g) of the poly (methylmethacrylate) grafted silica and the resulting mixture heated, with stirring, at 65° C. for 24 hours.

A tongue depressor was treated with the resulting FCSi/polymer graft suspension and tested for oil kit and dynamic water repellency essentially as described in Example 41. The treated depressor demonstrated oil bead up through 4 and holdout through 6 and excellent dynamic water repellency.

Example 45

D.I. water (50 g) was added to a SnO$_2$ suspension (50 g, 88SN-123, 20% solids, <10 nm particle size, pH 10, available from Nalco Chemical Co.) to produce an approximately 10% solids colloidal suspension. Mercaptopropyl trimethoxy silane (0.25 g, 0.13 mM/g) was added to this suspension and the mixture heated, with stirring, at 80° C. for 16 h.

Hydroxy ethyl acrylate (2.0 g, HEA, available from Aldrich Chemical Co.) was added to a 20 g aliquot of the resulting sol, the mixture heated to 60° C., degassed with N$_2$, and t-butylhydroperoxide (30 mg, 70% solids aqueous solution) added to the reaction mixture. The mixture was heated at 65° C. for 16 h to give a slightly opaque, stable suspension of SnO$_2$-g-HEA (1:1) graft.

Various modifications and alterations of this invention will become apparent to those skilled in the art without departing from the scope and spirit of the invention.

We claim:

1. A fluorochemical treatment composition comprising (a) a sol comprising a colloidal dispersion of substantially discrete, substantially monodisperse in size, polymer-grafted, inorganic microparticles in liquid; and (b) at least one fluorochemical, wherein said polymer-grafted, inorganic microparticles have been prepared by the polymer grafting of preformed, inorganic microparticles.

2. The composition of claim 1 wherein said liquid is selected from the group consisting of water, at least one organic liquid, and aqueous solutions of at least one organic liquid.

3. The composition of claim 1 wherein said inorganic microparticles comprise metal oxide selected from the group consisting of silica, titania, alumina, zirconia, vanadia, chromia, iron oxide, antimony oxide, tin oxide, and mixtures thereof.

4. The composition of claim 3 wherein said metal oxide is silica.

5. The composition of claim 1 wherein said inorganic microparticles have an average particle diameter in the range of from about 1 nanometer to about 200 nanometers.

6. The composition of claim 1 wherein said inorganic microparticles are grafted with polymer comprising polymerized units of at least one free-radically polymerizable, ethylenically-monounsaturated monomer.

7. The composition of claim 6 wherein said polymer further comprises at least one polymerized unit of at least one free-radically polymerizable, ethylenically-polyunsaturated monomer.

8. The composition of claim 6 wherein said monomer is selected from the group consisting of ethylenically-monounsaturated acids and anhydrides; ethylenically-monounsaturated macromers; ethylenically-monounsaturated, substituted and unsubstituted esters, amides, and nitriles; vinylidene monomers; and heterocyclic monomers.

9. The composition of claim 6 wherein said monomer is selected from the group consisting of alkyl acrylates and methacrylates having from 1 to about 18 carbon atoms, styrene, acrylic acid, methacrylic acid, itaconic acid, acrylamides and methacrylamides, fluorochemical-containing acrylates and methacrylates, and sodium sulfostyrene.

10. The composition of claim 6 wherein said monomer is selected from the group consisting of methyl methacrylate, methacrylic acid, butyl acrylate, and fluorochemical-containing acrylates.

11. The composition of claim 1 wherein said inorganic microparticles are grafted with polymer by means of at least one coupling agent which prior to grafting comprised at least one functional group which was capable of functioning as a chain transfer site for free radical polymerization.

12. The composition of claim 1 wherein said fluorochemical comprises at least one fluoroaliphatic or fluoroalicyclic group.

13. The composition of claim 12 wherein said group comprises a perfluorinated carbon chain having from about 3 to about 20 carbon atoms.

14. The composition of claim 12 wherein said group contains from about 40% to about 80% fluorine by weight and has a perfluorinated terminal portion.

15. The composition of claim 12 wherein said group is perfluorinated.

16. The composition of claim 15 wherein said group is a perfluorinated aliphatic group.

17. The composition of claim 1 wherein said fluorochemical is capable of chemical reaction or strong physical interaction with chemical groups on the surface of said inorganic microparticles.

18. The composition of claim 17 wherein said fluorochemical is a fluorochemical silane having at least one hydrolyzable or hydrolyzed group.

19. The composition of claim 18 wherein said fluorochemical silane is represented by the following general formula:

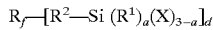

where $R_f$ is a monovalent or divalent, fluoroaliphatic or fluoroalicyclic group containing at least about 4 carbon atoms and at least about 25 weight percent fluorine; $R^2$ is a divalent linking group; $R^1$ is selected from the group consisting of lower alkyl groups having from 1 to about 4 carbon atoms and phenyl; a is an integer of 0 to 2; X is a hydrolyzable or hydrolyzed group; and d is an integer of 1 or 2.

20. The composition of claim 19 wherein said $R_f$ is selected from the group consisting of linear or branched fluoroaliphatic groups which are terminated with a trifluoromethyl group and which have from about 4 to about 24 carbon atoms and fluoroalicyclic groups which have from about 4 to about 24 carbon atoms.

21. The composition of claim 19 wherein said X is selected from the group consisting of halogen, alkoxy groups having from 1 to about 12 carbon atoms and optionally containing from 1 to about 11 ether oxygen atoms, and acyloxy.

22. The composition of claim 1 in substantially liquid-free form.

23. A treatment composition comprising a sol comprising a colloidal dispersion of substantially discrete, substantially monodisperse in size, polymer-grafted, inorganic microparticles in liquid; wherein said polymer-grafted, inorganic microparticles have been prepared by the polymer grafting of preformed, inorganic microparticles.

24. A treatment composition comprising a sol comprising a colloidal dispersion of substantially discrete, substantially monodisperse in size, polymer-grafted, silica microparticles in water, wherein said polymer-grafted, silica microparticles have been prepared by the grafting of preformed, silica microparticles with polymer comprising polymerized units of at least one monomer selected from the group consisting of methacrylic acid and fluorochemical-containing acrylates.

25. The composition of claim 23 in substantially liquid-free form.

26. A process for imparting durable water and oil repellency, stain release, and dry soil resistance properties to a substrate comprising the step of contacting a substrate with the composition of claim 1.

27. A process for imparting durable water and oil repellency, stain release, and dry soil resistance properties to a substrate comprising the steps of (a) contacting a substrate with a sol comprising a colloidal dispersion of substantially discrete, substantially monodisperse in size, polymer-grafted, inorganic microparticles in liquid; and (b) contacting said substrate with at least one fluorochemical; wherein said polymer-grafted, inorganic microparticles have been prepared by the polymer grafting of preformed, inorganic microparticles.

28. A process for imparting durable stain release and/or dry soil resistance properties to a substrate comprising the step of contacting a substrate with the composition of claim 23.

29. A treated article comprising the composition of claim 1 or the corresponding substantially liquid-free composition.

30. A treated article comprising the composition of claim 23 or the corresponding substantially liquid-free composition.

* * * * *